United States Patent [19]

Bateman et al.

[11] 4,147,277

[45] Apr. 3, 1979

[54] SERVING DISH

[75] Inventors: Robert F. Bateman, Greenville, R.I.;
Richard A. Boucher, Fitchburg, Mass.

[73] Assignee: Dart Industries Inc., Los Angeles, Calif.

[21] Appl. No.: 802,754

[22] Filed: Jun. 2, 1977

[51] Int. Cl.² .............................................. B65D 25/00
[52] U.S. Cl. .................................... 220/400; 220/22.3
[58] Field of Search ................. 220/17, 22, 22.1, 4 R, 220/4 C, 22.3, 400; D9/18, 184, 237; D7/16, 19, 38, 76, 77; 206/514

[56] References Cited

U.S. PATENT DOCUMENTS

| D. 105,367 | 7/1937 | Swordling | 220/22 X |
| 1,092,991 | 4/1914 | Heintz | 206/514 |
| 1,157,045 | 10/1915 | Risher | 220/22 |
| 2,459,561 | 1/1949 | Yawman | 220/22.3 |
| 3,164,285 | 1/1965 | Melich | 220/17 |
| 3,391,816 | 7/1968 | Swett | 220/17 X |
| 3,809,063 | 5/1974 | Hajnal | 220/17 X |

Primary Examiner—William Price
Assistant Examiner—Steven M. Pollard

[57] ABSTRACT

A serving dish having a selectively divisible colander member and cover adapted to closure either or both the dish and/or colander.

1 Claim, 8 Drawing Figures

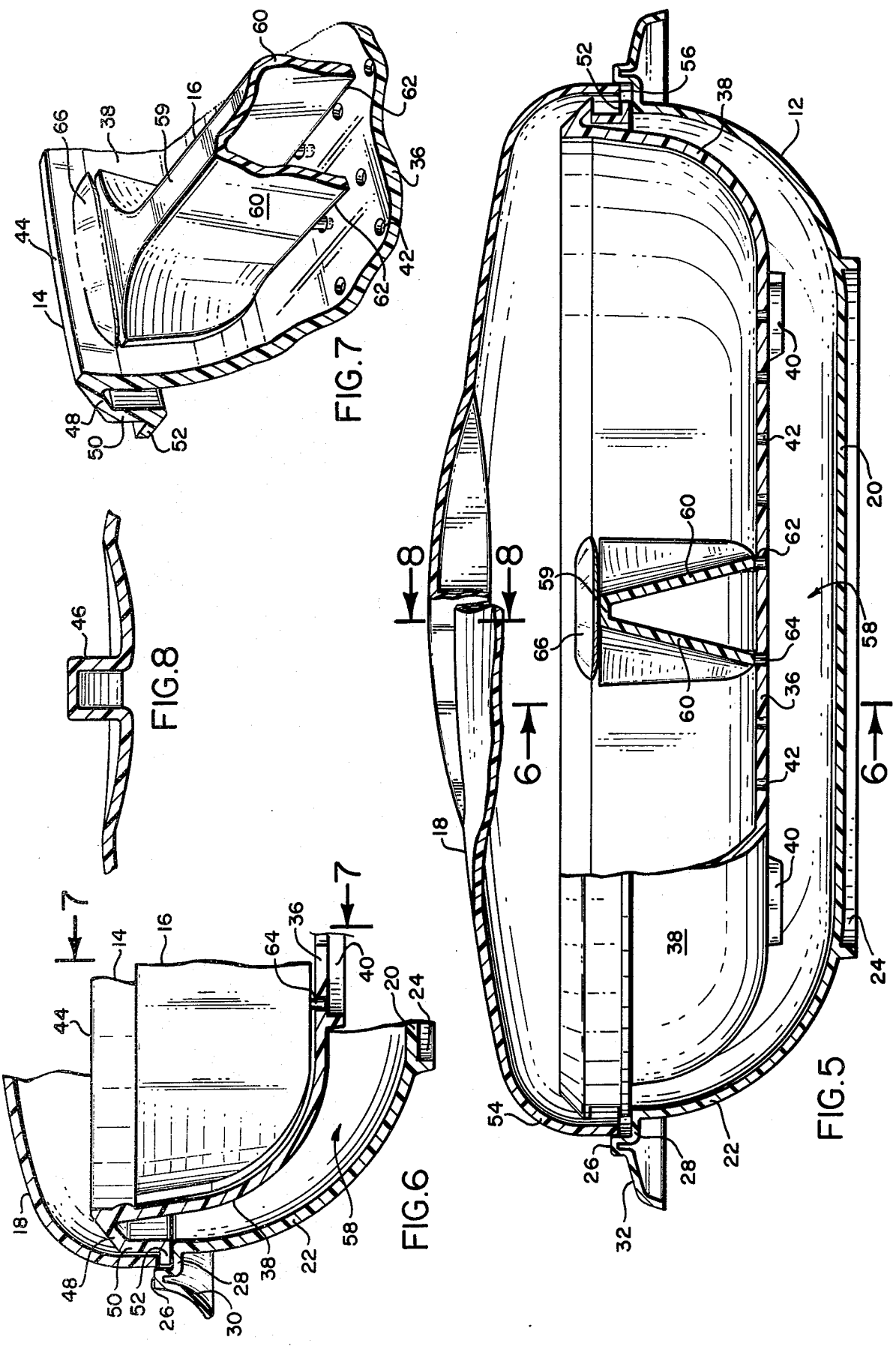

SERVING DISH

The present invention relates to a serving dish construction which is multi-functional in character due to its unique arrangement and interrelationship of elements. The dish may be used as (1) a typical covered serving dish, (2) a covered "steamer" dish either with a single or multi-compartmented colander member and (3) a covered single or multi-compartmented colander.

Although there are a variety of cooking and other utensils similar to the type described, such do not provide those structural characteristics that lend same to effective multi-function use. These prior art devices are primarily concerned with the cooking aspects thereof as opposed to the use of the device as a service item. Such are not for example concerned with the effective and selective retention of the cover upon either the colander member or the container and likewise upon both when assembled.

It is a principal objective of the present invention to provide a serving dish that with a minimum of separate elements can be used as a server, warmer/server and drainer. Furthermore, the construction is contemplated to be such that the colander portion may be divided to provide a dual service capability. Likewise, it is also an objective to have a closuring capability for the container and/or the colander and that the closuring concept for the combination is such that condensate formed on the interior of the cover will drain out of the colander and into the container.

Additional advantages and objectives will become more apparent upon a continuing reference to the specification claims and drawings wherein:

FIG. 5 is a partial cross section of the serving dish taken along line 5—5 of FIG. 1;

FIG. 6 is a partial cross section of the serving dish taken along line 6—6 of FIG. 5;

FIG. 7 is a partial cross section of the colander and divider taken along line 7—7 of FIG. 6; and FIG. 8 is a partial cross section of the cover handle taken along line 8—8 of FIG. 7.

Figure 1:
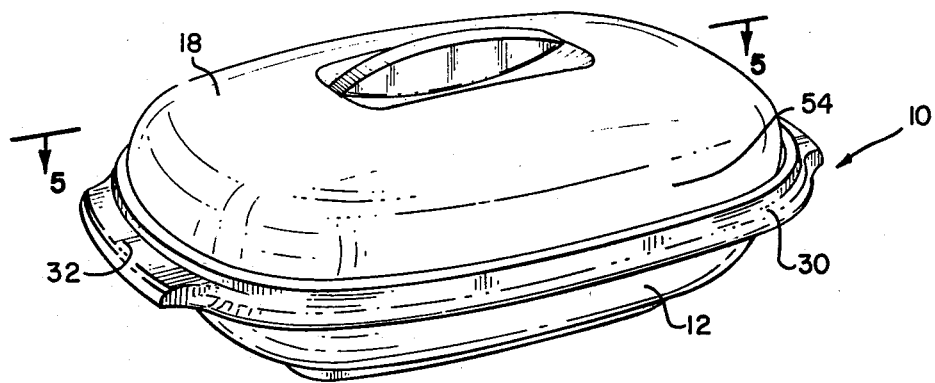
FIG. 1 is a top perspective view of the closured colander and container serving dish.
Figure 4:
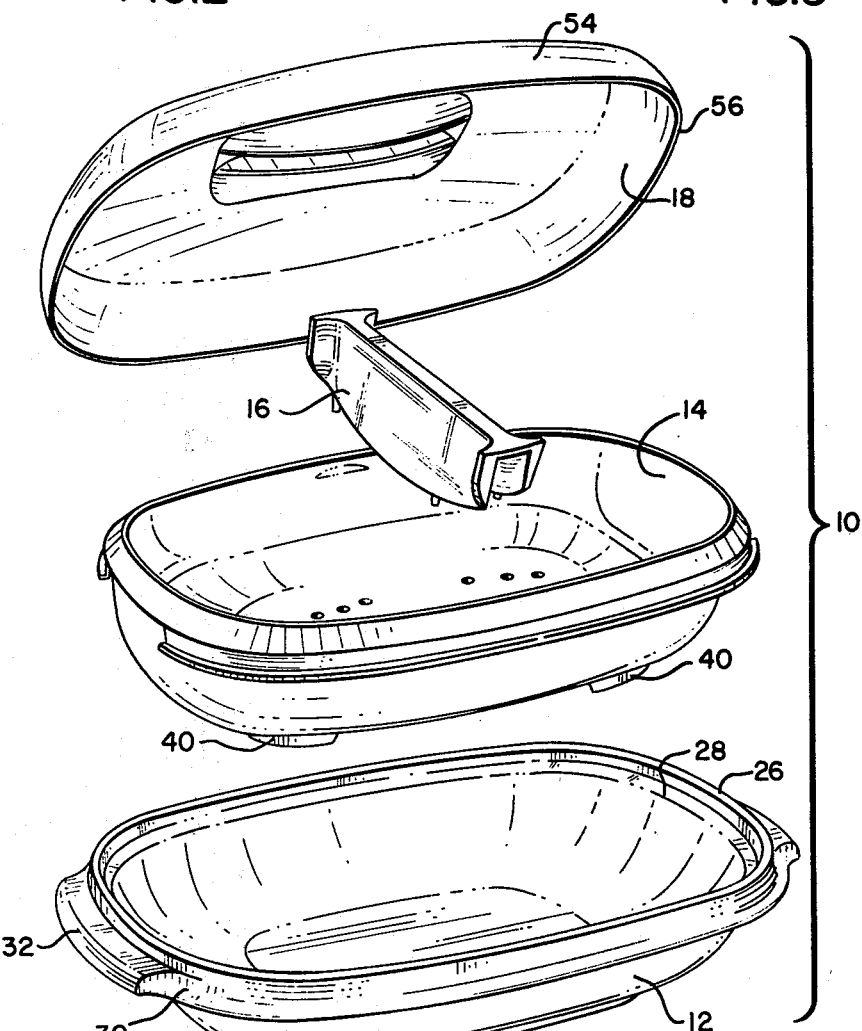
FIG. 4 is an exploded perspective view of the serving dish.

Referring to the drawings and more particularly to FIGS. 1 and 4 the serving dish 10 is comprised of a container 12, a colander 14 a divider 16 and a cover 18. These four elements are interengagable in the fashions shown to thereby create a multifaceted item of substantial versatility.

The container 12 incorporates an integral bottom wall 20 and side wall 22. The bottom wall 20 further includes a downwardly extending bead 24 which acts as a foot portion to support the container. The side wall 22 radiates outwardly and upwardly from bottom wall 20 to an upper terminal edge 26 having immediately adjacent thereto an upwardly directed ledge portion 28 and a peripherally extending outwardly protruding flange 30. Such flange 30 further includes, at appropriate opposed positions, handle members 32.

Figure 2:
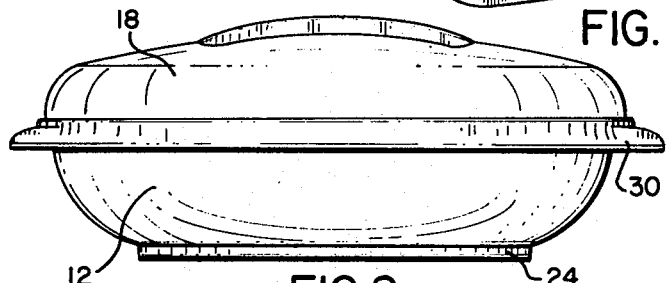
FIG. 2 is a side elevational view of the serving dish.
Figure 3:
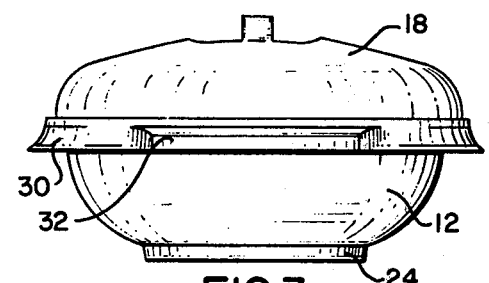
FIG. 3 is an end elevational view of the serving dish.

The colander member 14 which can best be seen in FIG. 2 is formed of an integral bottom wall 36 and side wall 38 arrangement. The bottom wall 36 thereof includes several foot portions 40 at appropriate points about the periphery thereof and has a plurality of openings 42 extending therethrough. The side wall 38 flares upwardly from bottom wall 36 to an upper terminus 44. Additional annular walls 48 and 50 emanate from upper terminus 44 to produce the peripherally extending downwardly positioned lip 52.

Both the container 12 and the colander 14 are adapted to be closured by the cover member 18 which includes the downturned wall configuration 54 having terminal edges 56 and a handle 46. Note that the size and shape of the cover member 18 corresponds to that of the additional annular walls 48 and 50 of colander 14. Accordingly, cover member 18 loosely fits over the colander so that terminal edge 52 mates with wall 50. These combined parts, colander 14 and cover member 18, therefore, can be used separate and apart from the other mentioned elements as a closured drainer unit. The cover member 18, of course, provides for substantial heat or other protection to the covered foodstuff as it drains.

In combination with container 12 the colander 14 can be seen (FIGS. 5 and 6) to be supported by its lip 52 upon ledge portion 28. Such support firmly spaces the bottom wall 36 and side wall 38 arrangement from the corresponding walls 36, 38 of the container 12. Accordingly, a well 58 is produced in which a heating or cooling medium may be placed to appropriately affect the foodstuff in the colander. Furthermore, since cover member 18 is loosely positioned about the colander condensate formed on the interior thereof will drain out of the colander basket area. Likewise, because the colander is supported interiorly of the container 12 as at the mating of lip 52 and ledge portion 28, this condensate will find its way to well 56 as opposed to the exterior of the container 12.

Additionally, the invention contemplates the use of a divider 16 for colander 14 so that two separate foodstuff items may be simultaneously retained therein. This divider 16 is formed of a top wall 59 and juxtaposed depending flexible walls 60 each having a bottom edge 62. These edges 62 have positioned there along a plurality of depending protuberances 64 of the approximate size and shape of openings 42 the bottom wall 36 of colander 14. The lateral extremities of the walls 60 flare outwardly, as at 65 to provide support means for divider 16 against the side wall 38 of colander 14. Likewise, wall 38 of the colander is provided with two oppositely positioned protrusions 66 under which the divider top wall 58 snaps into place. Furthermore, the walls 60 are flexible primarily because of the hinge effect created by their intersection with top wall 58. Also note that the bottom edges 62 and protuberances 64 of each wall 60 are laterally spaced from each other a different distance than are the respective openings 42 into which protuberances 64 are intended to be positioned. Accordingly, the walls 60 must be flexed to enable such engagement and the retained tension and stresses of such flexing tends to assist in firmly retaining the divider 16 in place.

As a final possible configuration the container 12 and cover member 18 may be used alone in a service or storage function with the terminal edge 56 resting upon ledge portion 28.

It may be seen from the foregoing description that the unique arrangement of parts provides for the multifaceted use of this dish and it may, likewise, be appreciated that same therefor offers numerous advantages over the prior art arrangements of similar items.

I claim:

1. A serving dish and comprising a container having an integral bottom wall and side wall structure said side wall including an upper terminal edge and incorporating an upwardly directed ledge portion immediately adjacent said edge, a colander member having an integral bottom wall and side wall arrangement, said side wall arrangement terminating in a peripherally extending downwardly positioned lip, which lip mates with said upwardly directed ledge thereby supporting the bottom wall and side wall arrangement of the colander in juxtaposition with but spaced from the bottom wall and side wall structure of the container, with said side wall thereof protruding above said upper terminal edge said bottom wall of the colander also having a plurality of openings extending therethrough, a divider having a top wall and juxtaposed depending walls from the bottom edge of which a plurality of protuberances depend, said protuberances being positioned so as to mate with certain of the openings in the bottom wall of said colander thereby firmly supporting the divider therein.

UNITED STATES PATENT OFFICE
CERTIFICATE OF CORRECTION

Patent No. 4,147,277      Dated April 3, 1979

Inventor(s) ROBERT F. BATEMAN et al

It is certified that error appears in the above-identified patent and that said Letters Patent are hereby corrected as shown below:

Column 3, line 1, cancel beginning with "1. A serving dish" to and including "the divider therein:" in column 4, line 10, and insert the following claim:

1. A serving dish and comprising a container having an integral bottom wall and side wall structure said side wall including an upper terminal edge and incorporating an upwardly directed ledge portion immediately adjacent said edge, a colander member having an integral bottom wall and side wall arrangement, said side wall arrangement terminating in a peripherally extending downwardly positioned lip, which lip mates with said upwardly directed ledge thereby supporting the bottom wall and side wall arrangement of the colander in juxtaposition with but spaced from the bottom wall and side wall structure of the container, said bottom wall of the colander also having a plurality of openings extending therethrough, a divider having a top wall and juxtaposed flexible depending walls from the bottom edge of which a plurality of protuberances being positioned so as to mate with certain of the openings in the bottom wall of said colander thereby firmly supporting the divider therein and a cover member having a downturned wall

UNITED STATES PATENT OFFICE
CERTIFICATE OF CORRECTION

Patent No. 4,147,277                    Dated  April 3, 1979

Inventor(s)  ROBERT F. BATEMAN et al

It is certified that error appears in the above-identified patent and that said Letters Patent are hereby corrected as shown below:

>    configuration that is positioned over said container colander
>    and divider with the terminal edge of said wall configuration
>    abutting and resting upon the downwardly positioned lip of
>    said colander.

*Signed and Sealed this*

*Ninth* Day of *December 1980*

[SEAL]

*Attest:*

SIDNEY A. DIAMOND

*Attesting Officer*    *Commissioner of Patents and Trademarks*